US011164106B2

(12) United States Patent
Varughese et al.

(10) Patent No.: US 11,164,106 B2
(45) Date of Patent: Nov. 2, 2021

(54) COMPUTER-IMPLEMENTED METHOD AND COMPUTER SYSTEM FOR SUPERVISED MACHINE LEARNING

(71) Applicant: International Business Machines Corporation, Armonk, NY (US)

(72) Inventors: Melvin Mathew Varughese, Cape Town (ZA); Francois P S Luus, Johannesburg (ZA); Ismail Y Akhalwaya, Johannesburg (ZA)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 15/924,292

(22) Filed: Mar. 19, 2018

(65) Prior Publication Data

US 2019/0287030 A1     Sep. 19, 2019

(51) Int. Cl.
*G06N 20/00*     (2019.01)
*G06F 16/28*     (2019.01)

(52) U.S. Cl.
CPC ........... *G06N 20/00* (2019.01); *G06F 16/285* (2019.01)

(58) Field of Classification Search
None
See application file for complete search history.

(56) References Cited

U.S. PATENT DOCUMENTS

| | | |
|---|---|---|
| 2005/0135667 A1 | 6/2005 | Saarela et al. |
| 2009/0252404 A1 | 10/2009 | Lecerf |
| 2019/0185943 A1* | 6/2019 | Breen ................. C12Q 1/6886 |

OTHER PUBLICATIONS

Feng et al., Dimensionality Reduction of Hyperspectral Image with Graph-Based Discriminant Analysis Considering Spectral Similarity, Remote Sensing, pp. 1-14 (Year: 2017).*
Yang et al., "Optimization Equivalence of Divergences Improves Neighbor Embedding", Proceedings of the 31 st International Conference on Machine Learning, Beijing, China, 2014. JMLR: W&CP vol. 32.
Van Der Maaten, "Accelerating t-SNE using Tree-Based Algorithms", Journal of Machine Learning Research 15, 2014, pp. 3221-3245.

\* cited by examiner

*Primary Examiner* — David R Vincent
(74) *Attorney, Agent, or Firm* — Shimon Benjamin (57) ABSTRACT

A computer-implemented method and computer system for supervised machine learning and classification comprises applying, by a dimensional visualization module incorporating a global objective function, an unsupervised dimension reduction algorithm to a dataset including a plurality of data points capable of visual representation to produce a dimensionally reduced dataset and parsing, by the dimensional visualization module, the dimensionally reduced dataset to a user interface module for visual display of the dimensionally reduced dataset. The method comprises receiving a user input indicative of a categorization of at least one of the data points within the dataset, applying, by the dimensional visualization module, the global objective function weighted in accordance with the indicative categorization, to the dimensionally reduced dataset to produce a user-enhanced dimensionally reduced dataset, and parsing, by the dimensional visualization module, the user-enhanced dimensionally reduced dataset to the user interface module for visual display of the dimensionally reduced dataset.

20 Claims, 6 Drawing Sheets

COMPUTER-IMPLEMENTED METHOD AND COMPUTER SYSTEM FOR SUPERVISED MACHINE LEARNING

BACKGROUND

The present invention relates to data classification and categorization and it relates specifically to a computer-implemented method and computer system for supervised machine learning.

SUMMARY

An example embodiment of the present invention relates to a computer-implemented method and computer system for supervised machine learning. Machine learning or AI (Artificial Intelligence) for the purposes of sorting unstructured or semi-structured data is becoming more powerful and more capable, as both computing power increases and learning algorithms become more advanced.

At one end of the spectrum, unstructured data can be classified or structured by machine learning only. Advantageously, this may be quick, not requiring human intervention. Disadvantageously, this may not lead to the most appropriate (or even remotely usable) results, if samples or data points of the unstructured data do not lend themselves to classification by that particular algorithm.

At the other end of the spectrum, unstructured data can be classified or structured by a human only. Advantageously, the structuring will then be appropriate. Disadvantageously, this can be hugely laborious or even impossible, depending on the nature of the unstructured data.

An example embodiment of the invention provides a computer-implemented method and computer system for supervised machine learning and classification. The method comprises applying, by a dimensional visualization module incorporating a global objective function, an unsupervised dimension reduction algorithm to a dataset including a plurality of data points capable of visual representation to produce a dimensionally reduced dataset and parsing, by the dimensional visualization module, the dimensionally reduced dataset to a user interface module for visual display of the dimensionally reduced dataset. The method comprises receiving, by the user interface module, a user input indicative of a categorization of at least one of the data points within the dataset, applying, by the dimensional visualization module, the global objective function weighted in accordance with the indicative categorization, to the dimensionally reduced dataset to produce a user-enhanced dimensionally reduced dataset, and parsing, by the dimensional visualization module, the user-enhanced dimensionally reduced dataset to the user interface module for visual display of the dimensionally reduced dataset. The method comprises clustering, by a clustering module incorporating a clustering function, the user-enhanced dimensionally reduced dataset to produce a user-enhanced clustered output.

Example embodiments of the invention also provide a corresponding computer system and a computer program product.

DETAILED DESCRIPTION

Figure 1:
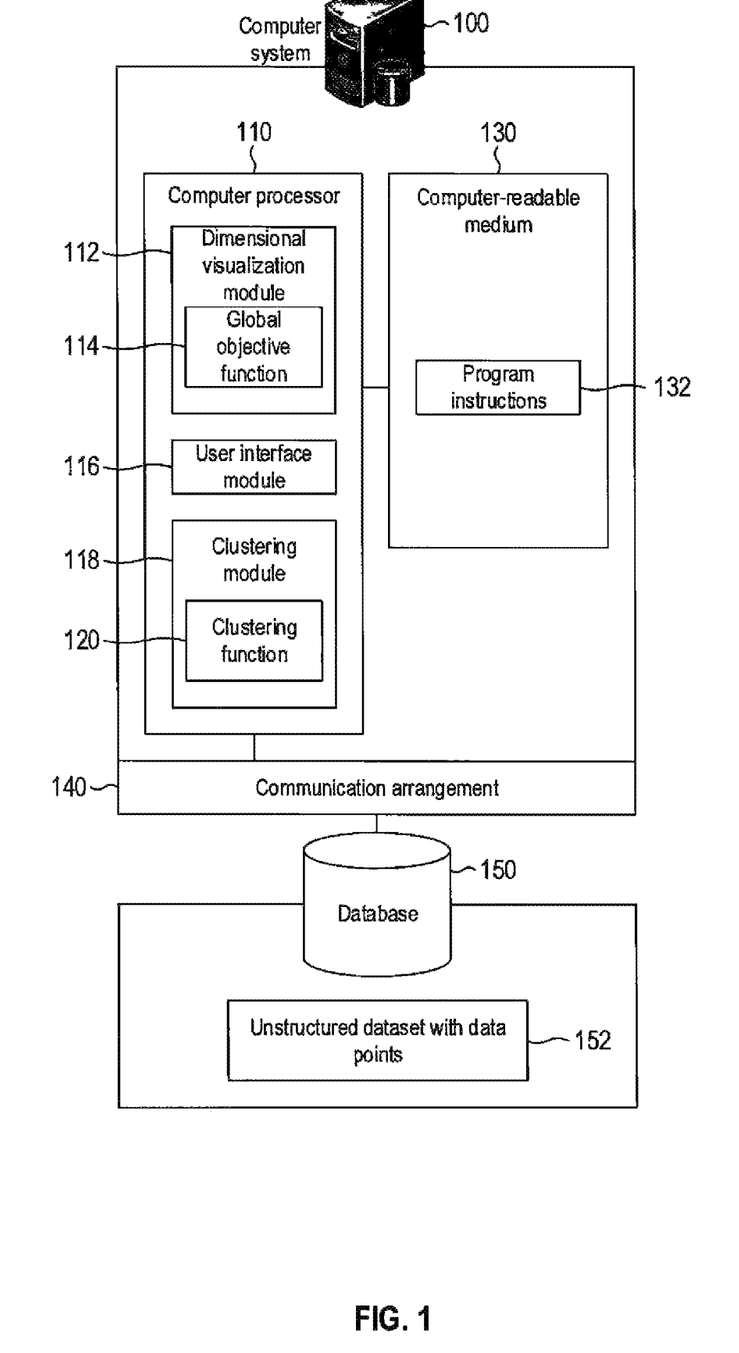
FIG. 1 illustrates a schematic view of a computer system for supervised machine learning, in accordance with an embodiment of the invention.
Figure 2:
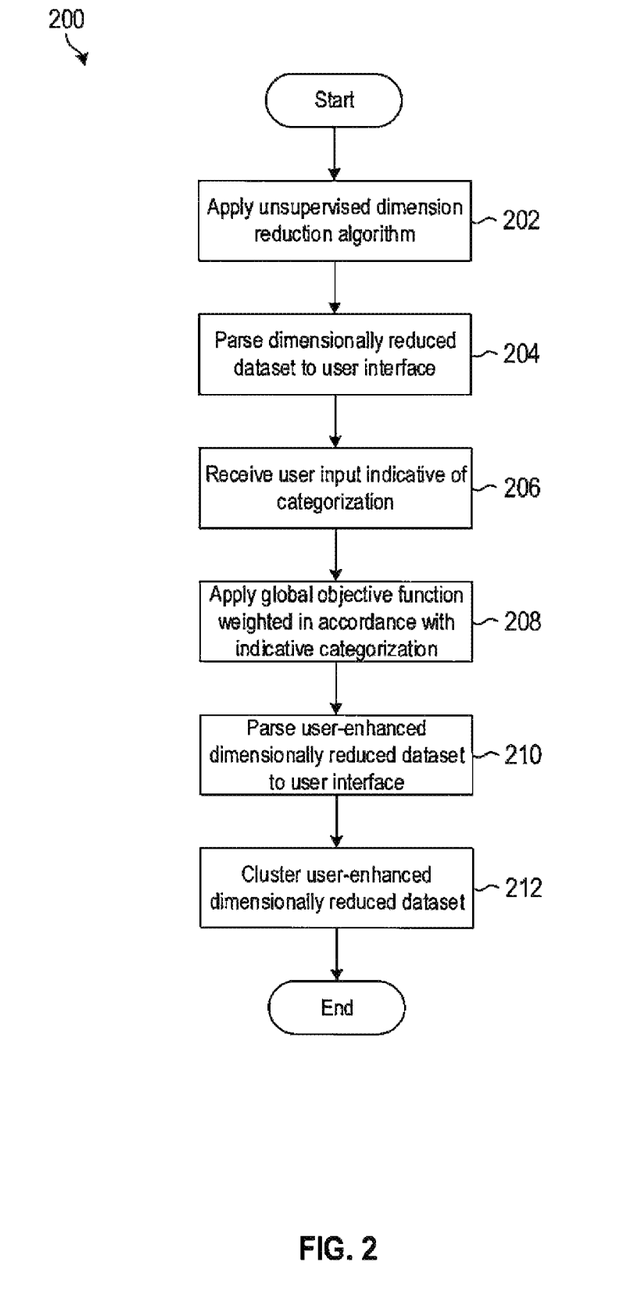
FIG. 2 illustrates a flow diagram of a method of supervised machine learning, in accordance with an embodiment of the invention.
Figure 3:
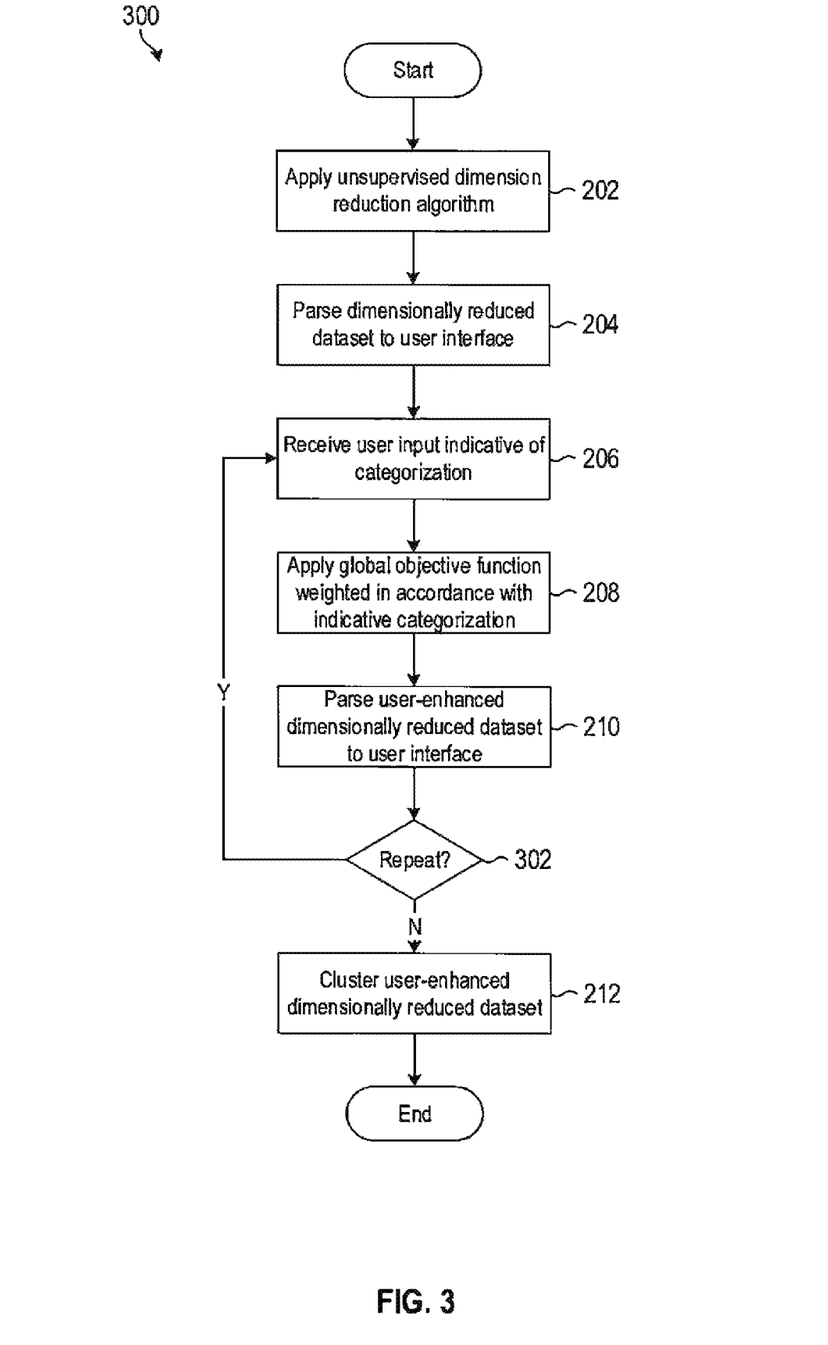
FIG. 3 illustrates a flow diagram of the method of FIG. 2 in a more developed implementation.

FIG. 1 illustrates a computer system 100 for supervised machine learning. Similarly, FIGS. 2-3 illustrate computer-implemented methods 200, 300 for supervised machine learning. The example embodiments may provide for supervised machine learning in which a machine assists a user by presenting a dataset of plural data points in a manner which is visually convenient for categorization or labelling, and the user assists the machine by categorizing the data points which provides for more meaningful presentation or clustering of the data points. The process may be recursive or iterative.

The computer system 100 comprises a computer processor 110 communicatively coupled to a computer-readable medium 130. The computer processor 110 may be one or more microprocessors, controllers, or any other suitable computing resource, hardware, software, or embedded logic. Program instructions 132 are stored on the computer-readable medium 130 and are configured to direct the operation of the processor 110. The processor 110 (under the direction of the program instructions 122) comprises a plurality of conceptual modules 112, 116, 118 which may correspond to functional tasks performed by the processor 110. The computer system 100 has a communication arrangement 140 for communication with other components and/or communication via a telecommunications network (e.g., the internet).

The computer system 100 may comprise a database 150 (or other form of data storage) coupled thereto. The database 150 has stored thereon the dataset 152. The dataset 152 may be unstructured or semi-structured data comprising a plurality of data points. The dataset is capable of a visual or a graphical representation and may, for example, comprise images, sound, text or symbols, sample feature vectors, etc. The dataset 152 may contain enough data points for at least each of a minimum of two categories that can be discovered through a selected given dimensionality-reducing feature extraction followed by a clustering operation.

A dimensional visualization module 112 comprises a global objective function 114 and can at least perform an initial dimension reducing step to present an initial unsupervised categorization or differentiation of the dataset 152 with at least one data point per category.

A user interface module 116 is configured to display the reduced dataset 152 visually. Further, the user interface module 116 may also be configured to present a graphical user interface (GUI) to the user via which the user may provide user input.

The communication arrangement 140 may be configured for communicating with a user device or terminal (not illustrated). The communication arrangement 140 may be a network interface for communication with the user terminal or other devices across a telecommunications network like the internet. The entire computer system 100 may be cloudhosted or provided as a PaaS (Platform as a Service). The user may use his terminal (e.g., a personal computer or laptop) to connect to the computer system 100 using conventional data communication techniques.

A clustering module 118 comprises a clustering function 120 which may be applied to the dataset 152 once the user has provided at least one categorization or other user input. Functionality of the modules 112, 116, 118 will be expanded upon with reference to the methods illustrated in FIGS. 2-3.

FIG. 2 illustrates a computer-implemented method 200 for supervised machine learning. The global objective function 114 realized by the dimensional visualization module 112 may be applied to the dataset 152 both before any user input has been received as a wholly unsupervised step or after user input has been received as a user-guided step.

The dataset 152 may be a high dimensional dataset with a large number (e.g. more than 10) of dimensions or classes or categories of descriptors or features. This may make for poor or highly cluttered visualization, which may inhibit the user's ability to provide meaningful input. Hence, the dimensional visualization module 112 applies an unsupervised dimension reduction step (at block 202) to yield a dimensionally reduced dataset which has a smaller number (e.g. 10 or less) of descriptors or feature dimensions.

If required, this dimensionally reduced dataset may then be processed through a further dimensionality reduction step to produce a two or three dimensional visualization for the user to interact with, also called a low-dimensional embedding calculation. The dimensional visualization module 112 may include a to-be-displayed threshold and the global objective function 114 may direct that the dataset 152 is dimensionally reduced until it is below the to-be-displayed threshold. The to-be-displayed threshold may be pre-defined or may be user-definable.

The low-dimensional embedding calculation produces a two or three dimensional visualization that displays graph elements, vertices and visible/invisible edges, which can undergo element-wise affine operations like translation, scaling and rotation according to user actions, the composition of which displays a categorization or differentiation of the set of observations. Graph-based low-dimensional visualization can include additional attributes, globally, locally and element-wise, such as coloring, texture, text overlay, image overlay, which can be used to display automatic clustering of groups through coloring of vertices by computing a fast clustering after each visualization update, and to allow the user to see corresponding input observations for specific graph elements such as when graph vertices are bijectively associated with input observations.

The dimensional visualization module 112 parses (at block 204) the dimensionally reduced dataset to the user interface module 116 for visual display of the dimensionally reduced dataset. In a local implementation, the dimensionally reduced dataset may be outputted to a connected display device, e.g., a computer screen. In a remote or networked implementation, the dimensionally reduced dataset may be communicated (e.g., via Internet Protocol (IP) messages) to a remote client for display on the remote client. The dimensionally reduced dataset may be displayed as a 3D orthogonal set of data represented in a 2D plane.

The user interface module 116 configures a GUI which presents various input options to the user. The input options may include the ability to pan view, zoom view, hover sample, select sample, deselect sample, annotate sample, label sample, select cluster, deselect cluster, annotate cluster, label cluster, pause calculation, resume calculation, stop calculation, start calculation, reset calculation, change neighborhood size, change neighborhood criteria, change distance metric selection, dataset selection, pre-processing options, etc. Generally, the user input is indicative of a categorization of one or more data points in the dimensionally reduced dataset. Categorization may include labelling, moving, selecting, deselecting, flagging, marking, etc. The user interface module 116 may also provide the user with an option to manipulate the data points without categorizing them, e.g., rotating the data points for a better view to enable the user to decide whether or not to label them.

The user interface modules 116 receive (at block 206) the user input. The user interface module 116 may be configured to categorize each of the input observations, together with additional relevant statistics and measurements, such as the probability of category membership and the categories in relation to user promoted data points within the categorization.

The dimensional visualization module 112 applies (at block 208) the received user input to the dimensionally reduced dataset to produce a user-enhanced dimensionally reduced dataset. This is done by using the same global objective function 114 by adding a weighting in accordance with the received use input. The user-enhanced dimensionally reduced dataset is parsed (at block 210) to the user interface module 116 for display to the user.

Accordingly, a core idea of the example embodiment may be to integrate user input of categorization (e.g., class exemplars) as a modified weighting in the global objective function 114 (now functioning as a weighted optimization algorithm), which performs dimensionality reduction for visualization and preliminary similarity grouping, such similar data points are clustered, grouped, highlighted, labelled, or otherwise indicated as potentially similar, with the user only selecting a few individual data points (e.g., reference samples) that have associated data points (e.g., expanded sample selections) based on an algorithm incorporating neighborhood information.

Once the user has providing input, the user-enhanced dimensionally reduced dataset may be subjected (at block 212) to a desired machine learning or AI function. In this example, the clustering module 118 applies the clustering function 120 to the original dataset 152 or to the user-enhanced dimensionally reduced dataset to produce an output of the system 100 in the form of a user-enhanced clustered output. For example, selecting an export option via the GUI may trigger the clustering and thereafter output a Comma-Separated Value (CSV) file with each row representing a different sample with the columns being the sample identifier and the label/number of the cluster.

Further exemplar cluster refinement is possible through user interface buttons such as "cluster label", which assigns a string to the cluster name, and "cluster deselect", which will deselect the subsequently clicked sample and its associated cluster, and "cluster refine", which deselects individual or group selected cluster samples from the larger cluster to refine small parts of the cluster.

FIG. 3 illustrates a flow diagram of a method 300 which is merely an iterative or repeated version of method 200. Blocks 206-210 are repeated (at block 302) indefinitely. Each time the user provides a user input, the visual display of the dataset is enhanced in accordance with the received user input which may group the data points more conveniently and makes it easier for the user to provide the next user input, and so on. Accordingly, the method 300 may be considered an interactive visualization process for labelling data points in a dataset, based on user feedback influencing a categorization calculation which can be tracked graphically and which updates a weighted optimization algorithm according to unsupervised calculations and user actions.

Figure 4:
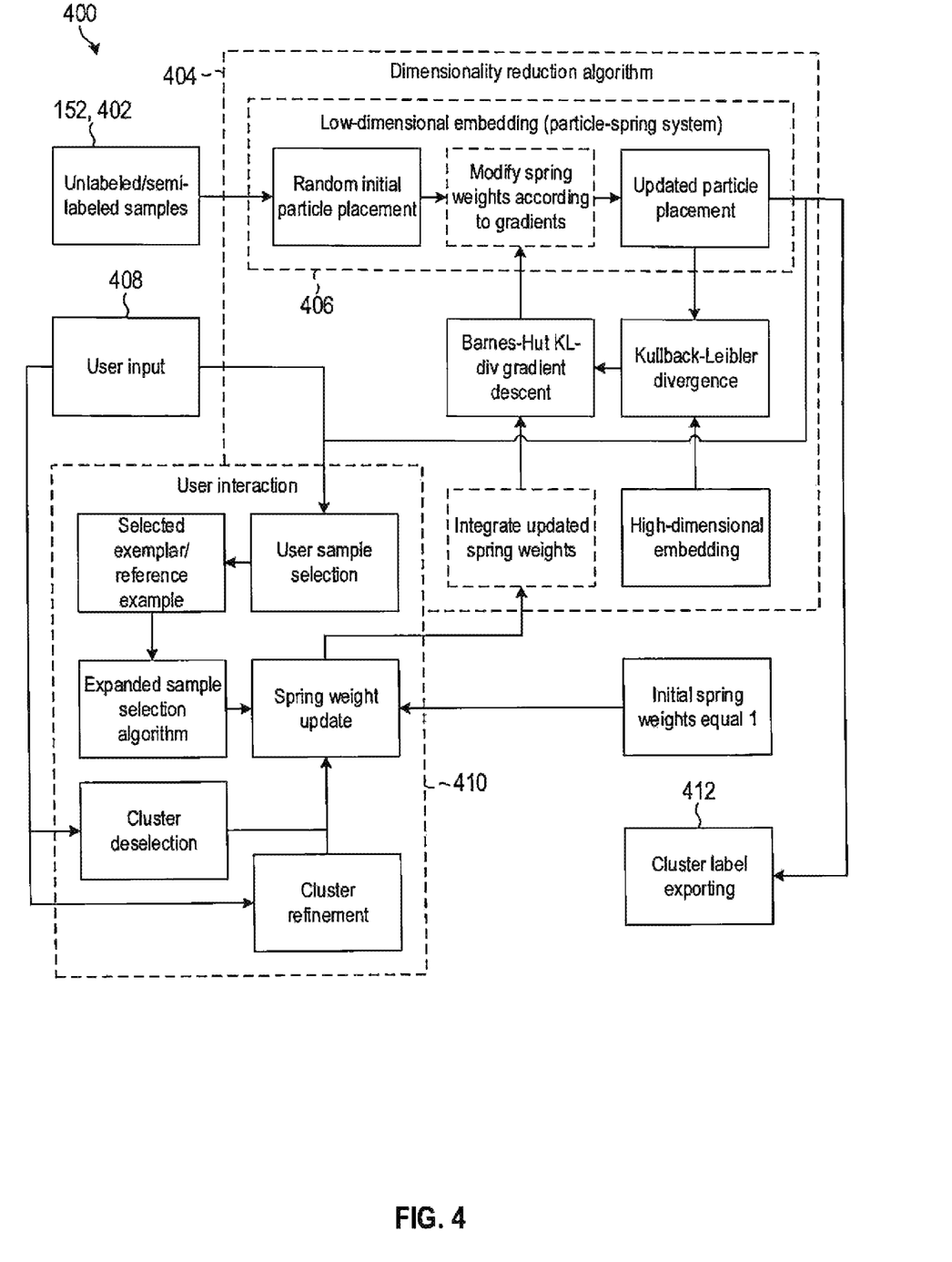
FIG. 4 illustrates a schematic block diagram of the method of FIG. 2 in an even more developed implementation.

FIG. 4 illustrates a functional block diagram 400 of aspects or sub-steps of the method 300 of FIG. 3 in more detail.

Figure 5:
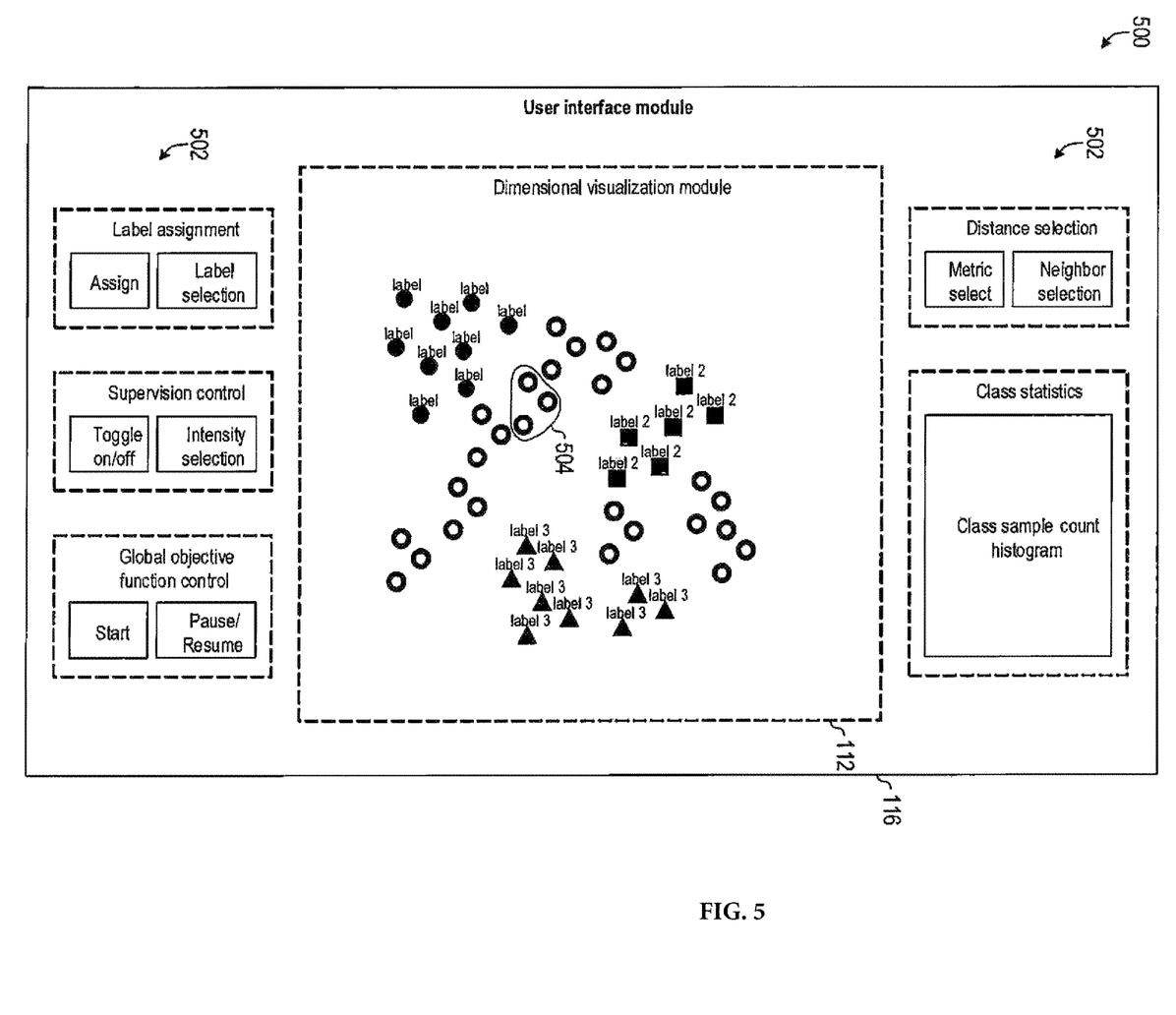
FIG. 5 illustrates a first user interface generated in accordance with the method of FIG. 2.
Figure 6:
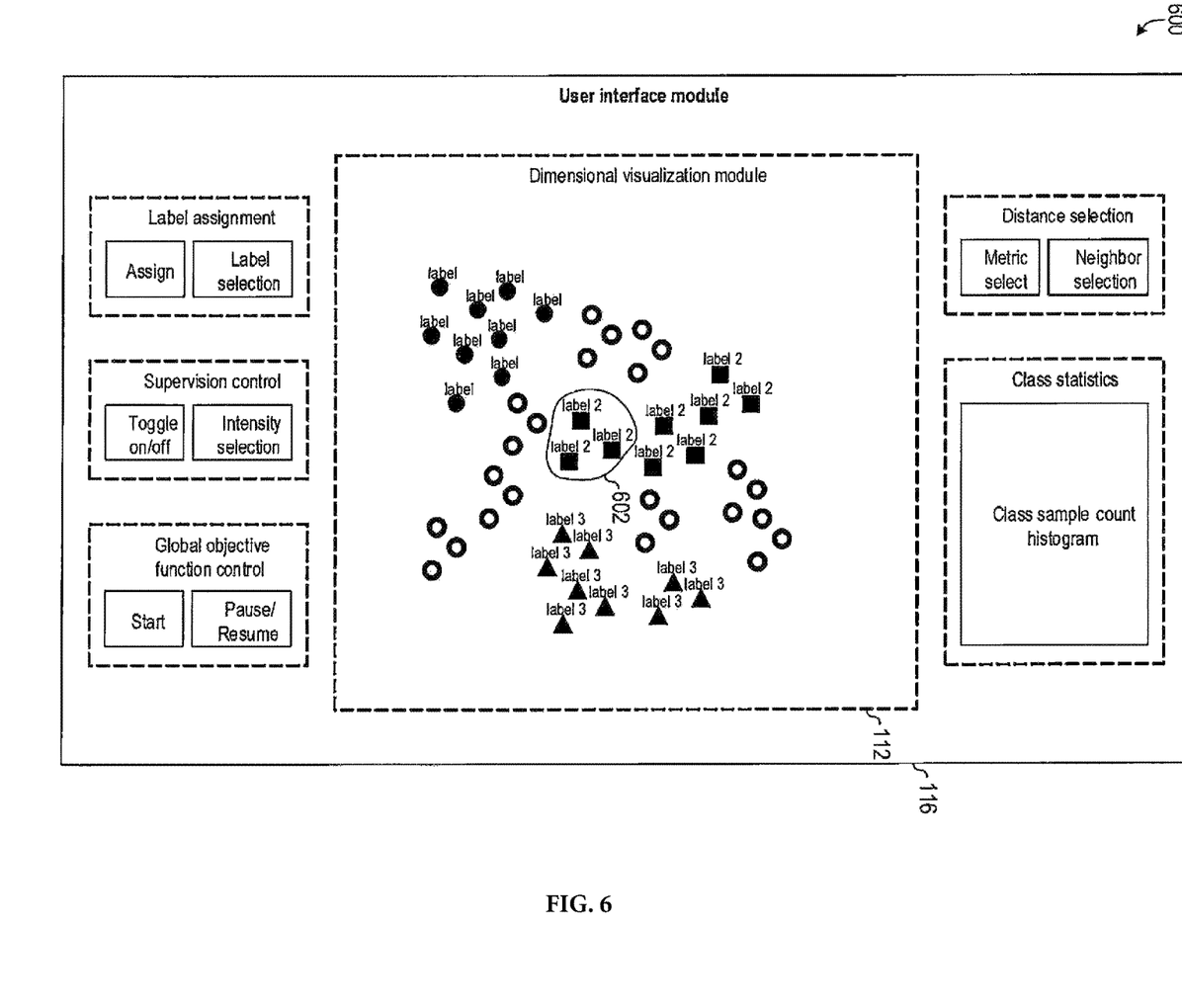
FIG. 6 illustrates a second user interface generated in accordance with the method of FIG. 2.

FIGS. 5-6 illustrates sequential graphical user interfaces (GUIs) 500, 600 generated in sequential steps of the method 300. The GUIs 500, 600 are rendered by the user interface module 116 and comprise data calculated and parsed from the dimensional visualization module 112. The GUIs 500, 600 may permit the user to manipulate each individual graph element or subsets of graph elements through the interactive display by selecting or manipulating a series of graphical elements, by changing the position of vertices, which is registered into the global objective function 114 as an additional constraint that should be attempted to be met in the low-dimensional embedding calculation.

The initial visual display of the dimensionally reduced dataset may promote vertices according to a series of unsupervised/internal or supervised/external information, separately or in combination, by adapting vertex spacing through edge repulsion/attraction, or by visually highlighting a selection of useful vertices to the user in a separate information display component. For example, cohesion or distinctness measures of categories or vertex degrees or similarity for neighbors in a limited vicinity as an internal measure, or unsupervised feature extraction reconstruction errors such as auto-encoder reconstruction errors can be used to promote graph spacing for low reconstruction errors and demote spacing for high reconstruction errors.

The user, by interacting with the provided GUI, can promote/demote edge repulsion by selection/deselection of graph vertices during any iteration in the low-dimensional embedding calculation. When a vertex is selected all its outgoing edges are updated to repulse adjacent vertices according to the relevant formulation. This user selection of vertices could be equivalent to the selection of canonical examples or exemplars which can form the seeds from which clusters or groups can form.

Exemplar/reference example selection by the user may initiate an algorithm that does expanded sample selection, which uses information from both the original dataset 152 and the dimensionally reduced dataset such as the pairwise distances to determine a surrounding group of similar points that may form a good cluster in the low-dimensional embedding around the exemplar. Such an expanded sample selection algorithm can restrict considered samples to the low-dimensional neighborhood, the size of which can be modified with a graphical element in the GUI, like a slider bar, and this low-dimensional neighborhood can be intersected with the high-dimensional exemplar neighborhood to obtain a resulting neighborhood.

Furthermore, because of the possibility of the user selecting an inferior exemplar, the dimensional visualization module 112 of the system 100 may search for a better exemplar in the dataset 152 according to the average similarity to its expanded sample being maximized where exemplar candidates are the immediate low-dimensional neighborhood of the selected exemplar. The dimensional visualization module 112 may then update the visualization of the expanded sample selection as better exemplars are calculated.

The user may iterate backward and forward through the computation iterations and decide where to provide supervision (that is, user input), and the dimensional visualization module 112 may re-perform the forward calculations from the iteration where supervision is given.

The global objective function 114 may comprise a dimensionality reduction algorithm 404 which is configured 1) to allow direct visualization of a feature space and 2) to gain an effective metric space that does not suffer from a drawback of dimensionality. This algorithm 404 may need to incorporate user decisions by direct changes to its objective function, and a sample expansion algorithm may be used to take limited user selections and produce a larger sample to ensure the objective function is changed enough to affect enough of an overall change. The algorithm 404 initially uses the unstructured dataset 152 in the form of unlabeled or semi-labeled samples 402 as an input.

The global objective function 114 may be based on a mathematical graph particle-spring system 406 for which each original input sample 402 in the original (usually) high-dimensional space has an associated particle, where the particle-spring system represents the low-dimensional embedding calculated iteratively by the algorithm 404. In other words, the samples 402 may be treated as a particle spring system in which at least two samples 402 form a pair with an attractive or repulsive force between the pair of data points. The user input may then serve to define pairs of data points or to modify the attractive or repulsive force (e.g., by promoting or demoting) between the pair of data points.

The particle-spring system 406 allocates random initial particle placements and then modifies springs of the particle-spring system according to gradients. Initially, the spring weight may be set to an arbitrary or unitary value, e.g., 1. Thereafter, the particle placements are updated.

For example, the global objective function 114 may be adapted from a Kullback-Leibler (KL) Divergence function to ensure that each particle-pair distance of the high dimensional space (of the original dataset 152, e.g., the set of samples 402) is proportional to the low-dimensional distance, such that if a histogram-shaped graph is drawn with the high-dimensional distance for every pair separately plotted as a bar, that the histogram-shaped graph for the low-dimensional distances would overlap correspondingly assuming that pair identities match across graphs on the x-axis. The gradients may be calculated by way of Barnes-Hut KL-divergence gradient descent function.

The optimization of the global objective function 114 for the particle-spring system can be gradient descent, with the initial solution being a random positioning of data points in this low-dimensional embedding of the dimensionally reduced dataset. Gradient descent may take place by moving the particle positions into a state where the gradient of the objective function is essentially zero thus indicating a local extrema. This effectively appears as an interaction of attractive and repulsive forces on each particle or data point, where the tension of every spring between every particle-pair or pair of data points is changed iteratively to produce a new overall positioning closer to the objective.

Integration of user decision in the global objective function 114, by using expanded sample selections (exemplar cluster) like neighborhoods of selected exemplars, can be done by weighting particles or data points individually with weight assignments that are stored and recalled for every iteration. If a sample 402 is part of the exemplar cluster then it will be assigned a relatively higher weight and it will affect more of the overall graph, whereas a non-exemplar sample will influence less of the graph. If the weight of a particle is zero then it has no effect on the graph change for that iteration.

In Yang et al. [1] the particle weighting method is used where a spring repulsive force is weighted by the product of the attached particle weights.

In FIG. 4, user input is generally indicated by numeral 408 and calculations necessitated or triggered by receipt of the user input are indicated in block 410. Integration of the received user input in the form of a user sample selection into the global objective function 114, by using expanded sample selections (exemplar cluster) like neighborhoods of selected exemplars, can also be done using an expanded sample selection algorithm, e.g., by individually weighting repulsive spring forces according to the cluster membership of the attached particles, and updating the spring weight in response to receipt of the user input 408. When attached particles belong to different exemplar clusters or if only one belongs to an exemplar cluster, then a higher repulsive force should result. The resulting set of weighted repulsive forces have to be normalized to have overall an equal influence to the attractive spring forces.

Acceleration of the optimization of the global objective function 114 may be done by considering the influence of a relatively far-away group or cluster of data points (relative to a given reference point) as if it has a single spring interaction at the reference point and not a set of individual spring interactions, this can have a logarithmic reduction in computational complexity on a sliding scale from $O \cdot N^2$ to $O \cdot N \cdot \log(N)$ (see Barnes-Hut algorithm in Van Der Maaten [2]).

A useful technical novelty of an example embodiment of the present invention may be a process of integrating weights into the accelerated optimization algorithm. For the weighted repulsive force approach, the repulsive forces are only weighted within local neighborhoods that are not far enough to be replaced by single springs, thus the Barnes-Hut acceleration is not lost by having to integrate spring-wise weighting for the entire graph. Attractive forces are not modified through weighting in this approach, as it is not strictly necessary given that the proportional interplay between repulsive and attractive forces can be achieved by only changing the relative influence of the repulsive forces.

The low-dimensional embedding calculation may terminate until further user action when a system objective has been met with a stopping condition of a maximum number of calculation iterations or a minimum objective change. Once the low-dimensional embedding calculation has terminated the user can switch on the system output which outputs category membership, distance from category centroid, distances from promoted vertices, etc.

Further exemplar cluster refinement is possible through the user interface buttons such as "cluster label", which assigns a string to the cluster name, and "cluster deselect", which will deselect the subsequently clicked sample and its associated cluster, and "cluster refine", which deselects individual or group selected cluster samples from the larger cluster to refine small parts of the cluster. These are examples of specific user inputs.

Once the user has finished with the user input phase, he may select a finalize or output option and then a machine learning clustering function is applied by the clustering module 118 to the dataset 152 weighted by, or otherwise taking into consideration, the received user inputs. There may be various clustering functions or other machine learning algorithms that can be applied to the dataset 152 so the precise AI algorithm is not germane to this example. However, the clustering is enhanced by use of the user input which serves to guide or supervise the clustering or other AI function.

Finally, the user may export (at block 412) the clustered labels or labeled samples 452 for onward use, e.g., to be the input for a machine learning or AI algorithm.

FIG. 5 shows a GUI 500 provided by the user interface module 116. The GUI comprises a number of user input options 502 down each side of the GUI. A central portion of the GUI 500 shows a 2D graphical illustration of the dataset 152 including a plurality of samples, some of which have already been labeled. The 2D graphical illustration is provided by the dimensional visualization module 112, as described above.

The labelled data points or samples of the dataset 152 are grouped or clustered. Unlabeled data points may be distributed or spaced around the display. For example, the user may wish to apply a label to some (three, for example) of the unlabeled data points 504. He may manipulate the display using the various input options 502 and also apply a desired label to the unlabeled data points 504. In this example, the user applies "label 2" to the unlabeled data points 504.

Upon receipt of this user input, the relative spring weightings between the data points is adjusted (refer to FIG. 4 for detail) and the dimensional visualization module 112 recalculates and displays the three newly labeled points 602 as being clustered with, or more proximate to, the other data points with the same "label 2" identifier. This process can be repeated iteratively for plural samples with various labels or other categorization criteria. After each input or set of inputs, the graphical display is updated. This may make it easier or at least more visually meaningful and enable the user to provide further input more quickly or to amend or deselect previous inputs.

An embodiment of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

REFERENCES

[1] Yang, Z., Peltonen, J. and Kaski, S., 2014. Optimization Equivalence of Divergences Improves Neighbor Embedding. In ICML (pp. 460-468)

[2] Van Der Maaten, L., 2014. Accelerating t-SNE using tree-based algorithms Journal of machine learning research, 15(1), pp. 3221-3245.

What is claimed is:

1. A computer-implemented method for supervised machine learning, the method comprising:
applying, by a dimensional visualization module incorporating a global objective function, an unsupervised dimension reduction algorithm to a dataset including a plurality of data points capable of visual representation to produce a dimensionally reduced dataset;
parsing, by the dimensional visualization module, the dimensionally reduced dataset to a user interface module for visual display of the dimensionally reduced dataset;
receiving, by the user interface module, a user input indicative of a categorization of at least one of the data points within the dataset;
applying, by the dimensional visualization module, the global objective function weighted in accordance with the indicative categorization, to the dimensionally reduced dataset to produce a user-enhanced dimensionally reduced dataset;
parsing, by the dimensional visualization module, the user-enhanced dimensionally reduced dataset to the user interface module for visual display of the user-enhanced dimensionally reduced dataset; and clustering, by a clustering module incorporating a clustering function, the user-enhanced dimensionally reduced dataset to produce a user-enhanced clustered output.

2. The method of claim 1, wherein the following are performed iteratively or repetitively:

receiving the user input indicative of the categorization of the data points;

applying the global objective function weighted in accordance with the indicative categorization to produce a user-enhanced dimensionally reduced dataset; and parsing the user-enhanced dimensionally reduced dataset to the user interface module for visual display of the user-enhanced dimensionally reduced dataset.

3. The method of claim 2, wherein the visual display of the user-enhanced dimensionally reduced dataset is updated in real-time in response to receipt of the user input.

4. The method of claim 1, wherein the dimensional visualization module processes the dataset as a particle spring system in which at least two data points within the dataset form a pair with an attractive or repulsive force between the pair of data points.

5. The method of claim 4, wherein the global objective function is configured to define pairs of data points or to modify the attractive or repulsive force between the pair of data points based on the received user inputs.

6. The method of claim 4, wherein the dimensional visualization module is configured to define a relatively far-away group or cluster of data points, relative to a given reference point, as if it has a single spring interaction with the reference point and not a set of individual spring interactions.

7. The method of claim 1, wherein the dimensional visualization module is configured to reduce a number of dimensions of the dataset to or below a to-be-viewed threshold for visual display to the user.

8. The method of claim 1, wherein:

the user interface module is configured to permit the user to cycle backwards and forwards through previous user inputs; and the dimensional visualization module is configured to produce the user-enhanced dimensionally reduced dataset in accordance with the cycled user input.

9. The method of claim 1, wherein the received user input serves as guidance or supervision for the clustering module to perform the clustering on the dataset.

10. A computer system for supervised machine learning, the computer system comprising:

a computer processor; and a computer readable storage medium having stored thereon program instructions executable by the computer processor to direct the operation of the processor, wherein the computer processor, when executing the program instructions, comprises:

a dimensional visualization module incorporating a global objective function configured to apply an unsupervised dimension reduction algorithm to a dataset including a plurality of data points capable of visual representation to produce a dimensionally reduced dataset; and a user interface module, wherein the dimensional visualization module is configured to parse the dimensionally reduced dataset to the user interface module for visual display of the dimensionally reduced dataset, wherein:

the user interface module is configured to receive a user input indicative of a categorization of at least one of the data points within the dataset;

the dimensional visualization module is configured to apply the global objective function weighted in accordance with the indicative categorization, to the dimensionally reduced dataset to produce a user-enhanced dimensionally reduced dataset; and the dimensional visualization module is configured to parse the user-enhanced dimensionally reduced dataset to the user interface module for visual display of the user-enhanced dimensionally reduced dataset; and a clustering module incorporating a clustering function and configured to cluster the user-enhanced dimensionally reduced dataset to produce a user-enhanced clustered output.

11. The system of claim 10, wherein the dimensional visualization module and the user interface module are configured to perform iteratively or repetitively:

receive the user input indicative of the categorization of the data points;

apply the global objective function weighted in accordance with the indicative categorization to produce a user-enhanced dimensionally reduced dataset; and parse the user-enhanced dimensionally reduced dataset to the user interface module for visual display of the user-enhanced dimensionally reduced dataset.

12. The system of claim 11, wherein the dimensional visualization module is configured to update the user-enhanced dimensionally reduced dataset in real-time in response to receipt of the user input.

13. The system of claim 10, wherein the dimensional visualization module processes the dataset as a particle spring system in which at least two data points within the dataset form a pair with an attractive or repulsive force between the pair of data points.

14. The system of claim 13, wherein the global objective function is configured to define pairs of data points or to modify the attractive or repulsive force between the pair of data points based on the received user inputs.

15. The system of claim 13, wherein the dimensional visualization module is configured to define a relatively far-away group or cluster of data points, relative to a given reference point, as if it has a single spring interaction with the reference point and not a set of individual spring interactions.

16. The system of claim 10, wherein the dimensional visualization module is configured to reduce a number of dimensions of the dataset to or below a to-be-viewed threshold for visual display to the user.

17. The system of claim 10, wherein:

the user interface module is configured to permit the user to cycle backwards and forwards through previous user inputs; and the dimensional visualization module is configured to produce the user-enhanced dimensionally reduced dataset in accordance with the cycled user input.

18. The system of claim 10, wherein the received user input serves as guidance or supervision for the clustering module to perform the clustering on the dataset.

19. A computer program product for supervised machine learning, the computer program product comprising:

a computer-readable medium having stored thereon:

first program instructions executable by a computer processor to cause the computer processor to apply an unsupervised dimension reduction algorithm to a dataset including a plurality of data points capable of visual representation to produce a dimensionally reduced dataset;

second program instructions executable by the computer processor to cause the computer processor to parse the dimensionally reduced dataset to a user interface for visual display of the dimensionally reduced dataset and to receive a user input indicative of a categorization of at least one of the data points within the dataset, wherein the first program instructions are configured to weight the dimensionally reduced dataset in accordance with the indicative categorization to produce a user-enhanced dimensionally reduced dataset, and wherein the second program instructions are configured to parse the user-enhanced dimensionally reduced dataset to the user interface for visual display; and third program instructions executable by the computer processor to cause the computer processor to cluster the user-enhanced dimensionally reduced dataset to produce a user-enhanced clustered output.

20. The computer program product of claim 19, wherein:
the first and second program instructions are configured to receive the user input indicative of the categorization of the data points, weight the dimensionally reduced dataset in accordance with the indicative categorization to produce a user-enhanced dimensionally reduced dataset, parse the user-enhanced dimensionally reduced dataset to the user interface for visual display, repetitively or iteratively.

* * * * *